United States Patent [19]

Saito

[11] Patent Number: 5,893,602
[45] Date of Patent: Apr. 13, 1999

[54] COVER STRUCTURE FOR TUBULAR SUPPORT MEMBER

[75] Inventor: Yoshiharu Saito, Wako, Japan

[73] Assignee: Honda Giken Kogyo Kabushiki Kaisha, Tokyo, Japan

[21] Appl. No.: 08/898,472

[22] Filed: Jul. 22, 1997

[30] Foreign Application Priority Data

Jul. 25, 1996 [JP] Japan .................................. 8-195918

[51] Int. Cl.$^6$ .................................................. B62D 25/06
[52] U.S. Cl. ........................ 296/102; 296/191; 280/756
[58] Field of Search .......................... 296/191, 39.1, 296/102; 280/756

[56] References Cited

U.S. PATENT DOCUMENTS 4,750,778  6/1988  Hoban ........................................ 296/66
5,588,694  12/1996  Koehr .................................... 380/756 X

FOREIGN PATENT DOCUMENTS 1182282  2/1970  United Kingdom ................... 296/102

*Primary Examiner*—D. Glenn Dayoan
*Assistant Examiner*—Jason Morrow
*Attorney, Agent, or Firm*—Armstrong, Westerman, Hattori, McLeland & Naughton

[57] ABSTRACT

In order to simply and decently cover the clearance between the vehicle panel and the roll bar or support strut thereof, which extends through the vehicle panel, notches $12_1$ and $13_1$ in elements of a roll bar strut cover 10 formed in a foldable plate member made of resin are, by folding, made to form a circular enclosure, without any clearance, about a roll bar or strut thereof which is secured to a vehicle frame and which extends outside from an opening $9_1$ in a vehicle panel 9. A trim member 15 is mounted to the vehicle panel 9 from above the cover 10 such that the cover 10 is sandwiched between the trim member 15 and an upper surface of the vehicle panel 9. Even if there is a slight error in the mounting position of the roll bar strut 5, the strut cover 10 can move to follow the roll bar strut 5 and therefore, no clearance is generated between the cover 10 and the strut 5.

3 Claims, 7 Drawing Sheets

FIG.7
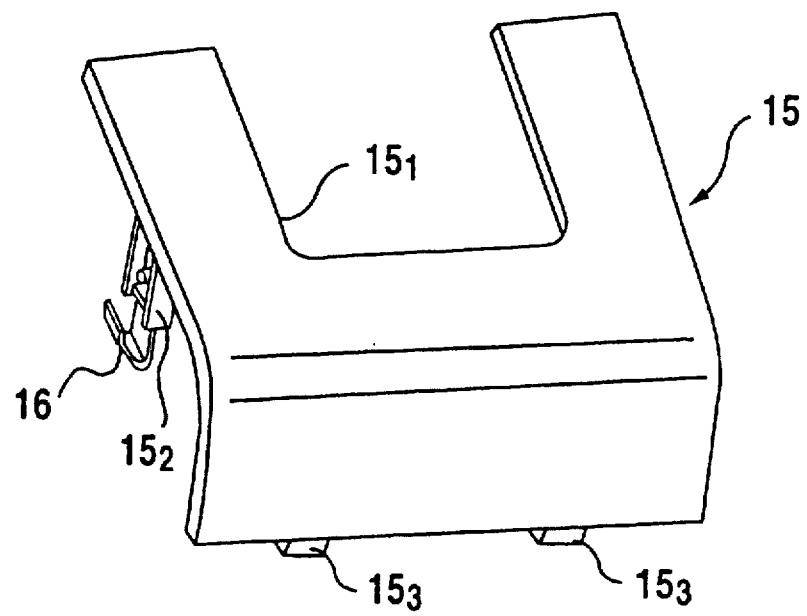
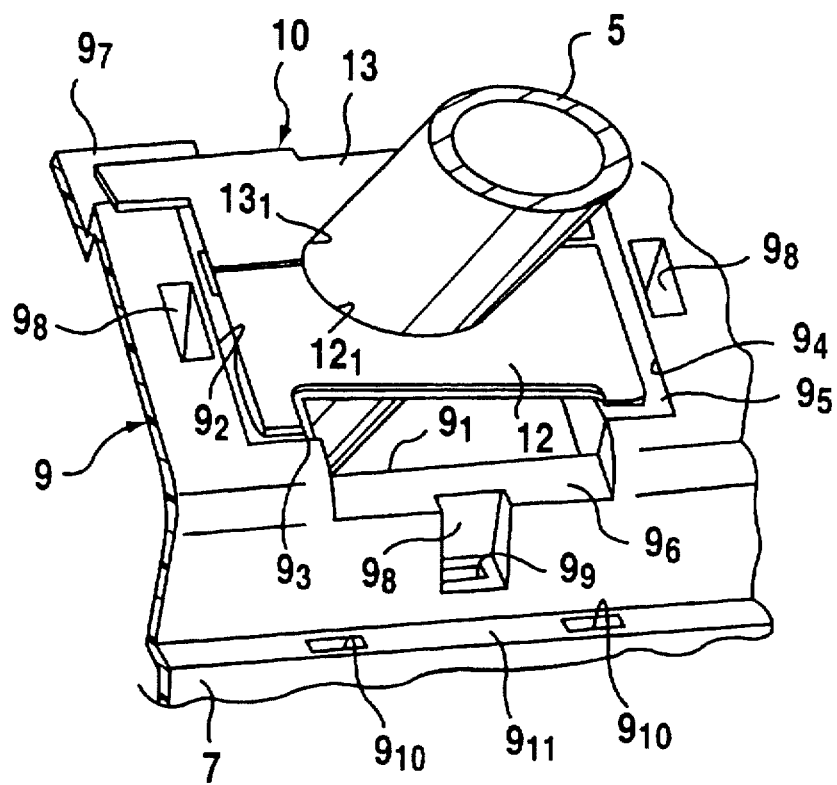

COVER STRUCTURE FOR TUBULAR SUPPORT MEMBER

BACKGROUND OF THE INVENTION

1. Technical Field

The present invention relates to a cover structure for enclosing a tubular support member, such as a roll bar or strut therefor which passes through a vehicle panel.

2. Prior Art

Because a vehicle roll bar needs to support a large load, it is mounted to a vehicle frame which is a strong member, and passes through an opening formed in the vehicle panel (or a trim member mounted to the vehicle panel) and extends outside. Since it is difficult to prevent slight errors in the mounting position of the roll bar from being generated, a size of the opening to receive the roll bar or a strut member for supporting the roll bar is set slightly larger than the roll bar or strut so as to avoid interference therewith. Consequently, a clearance is inevitably generated between an outer periphery of the roll bar or strut and the opening in the vehicle panel. Conventionally, such a clearance is closed by welding a metal clearance-cover about the outer periphery of the roll bar or strut within the vehicle panel, or by adhering or pressing under pressure a clearance-cover made of resin to or into the opening about the outer periphery of the roll bar or strut.

PROBLEM TO BE SOLVED BY THE INVENTION

However, in the above-described conventional technique using the cover, there is a problem that, although an interior of the vehicle panel becomes invisible through the clearance between the enclosed support member and the opening of the vehicle panel, the clearance itself still remains visible and thus, degradation of vehicle appearance cannot be avoided.

SUMMARY OF THE PRESENT INVENTION

The present invention has been accomplished in view of the above circumstances, and it is an object of the present invention to simply and presentably cover the clearance between the vehicle panel and the projecting support member, such as the roll bar or its support member, which extends through the vehicle panel.

To achieve this object, according to a principle aspect of the invention the projecting support member passes through a cover without any clearance, the cover being movably supported between the vehicle panel and the trim member. Therefore, even if there is a slight error in the mounting position of the support member, the cover moves such as to follow the enclosed member to prevent a clearance from being generated around the outer periphery thereof.

According to another aspect of the invention, if a notch in a first plate member of the cover is fitted about the outer periphery of the roll bar or strut and then, second and third plate members are folded with respect to the first plate member, notches in the second and third plate members are closely contacted with the entire periphery of the roll bar or strut without any clearance. Therefore, the cover can be mounted to an intermediate portion of the roll bar or strut without having to install the cover from a tip end of the enclosed member, which enhances the assembling properties.

BRIEF DESCRIPTION OF THE DRAWINGS

FIG. 7 is a partial exploded perspective view of an essential portion of the roll bar organization according to the present invention.

DESCRIPTION OF A PREFERRED EMBODIMENT OF THE INVENTION

A preferred mode for carrying out the invention will be explained based on an embodiment of the invention shown in the accompanying drawings.

Figure 1:
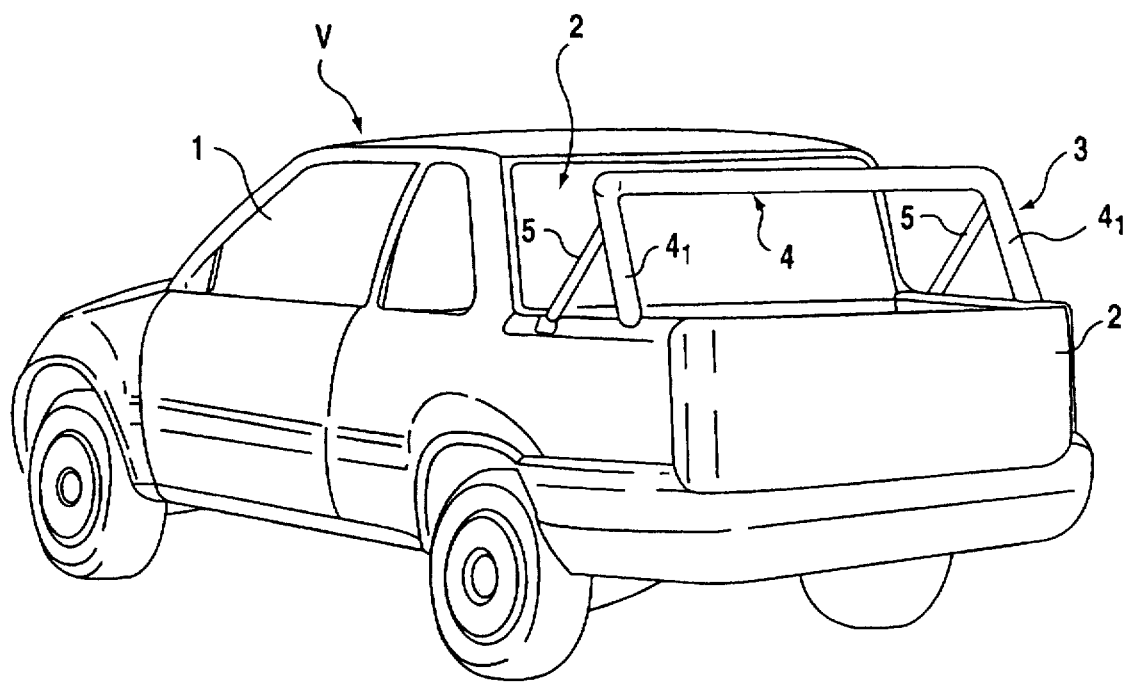
FIG. 1 is a perspective view of a motor vehicle having a roll bar stiffened by struts.
Figure 2:
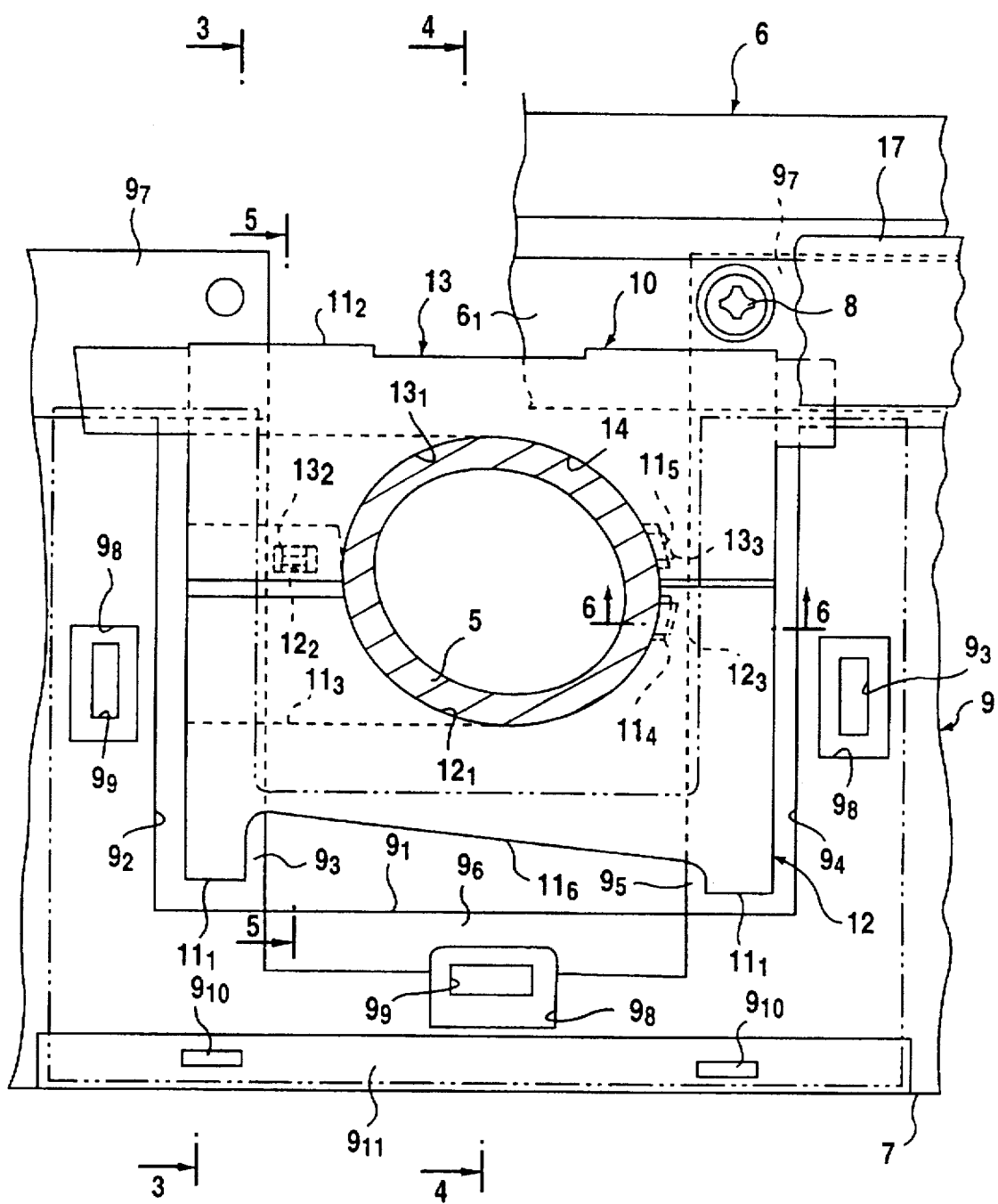
FIG. 2 is an enlarged view taken along the arrow 2 in FIG. 1.
Figure 3:
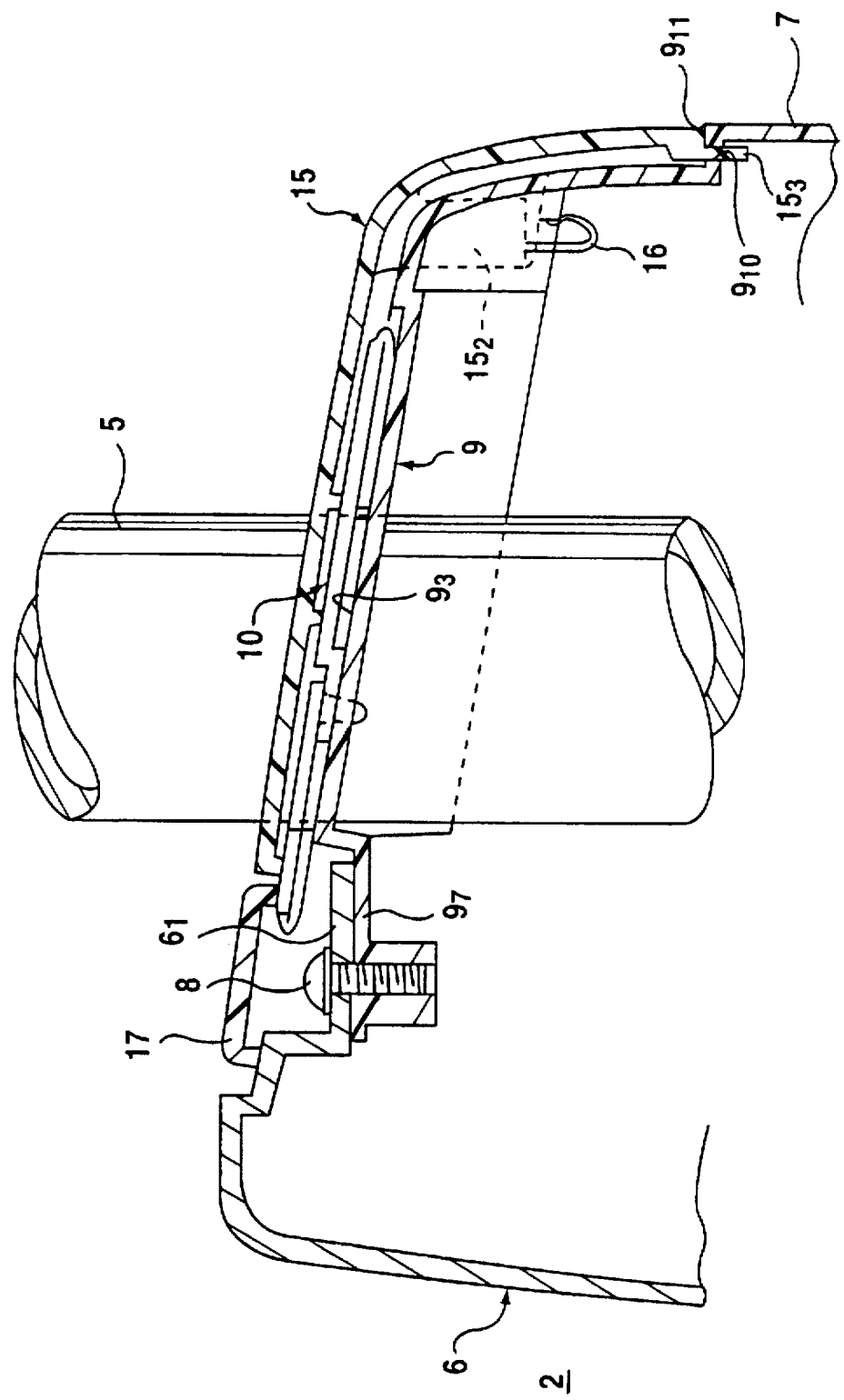
FIG. 3 is a sectional view taken along the line 3—3 in FIG. 2.
Figure 4:
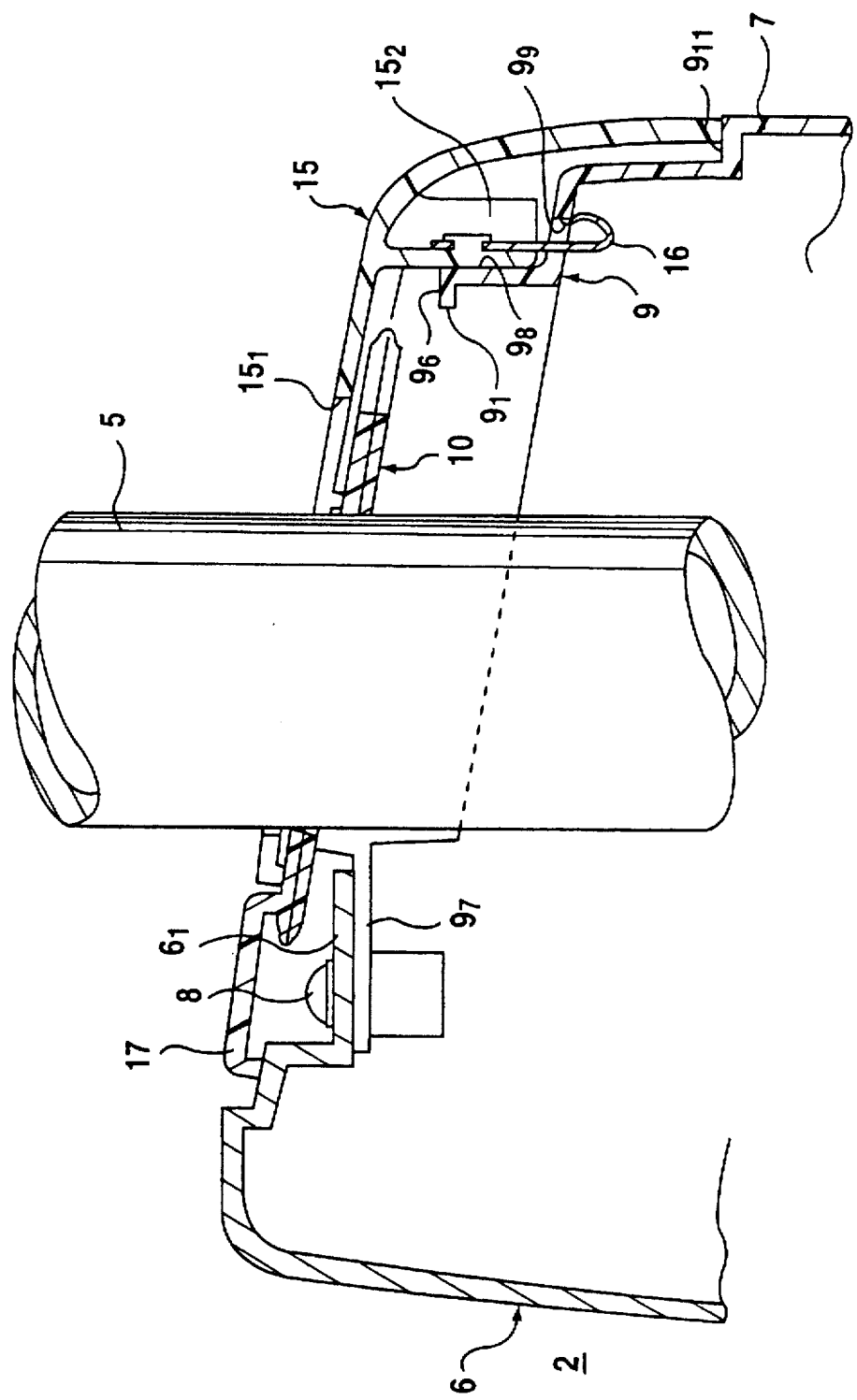
FIG. 4 is a sectional view taken along the line 4—4 in FIG. 2.
Figure 5:
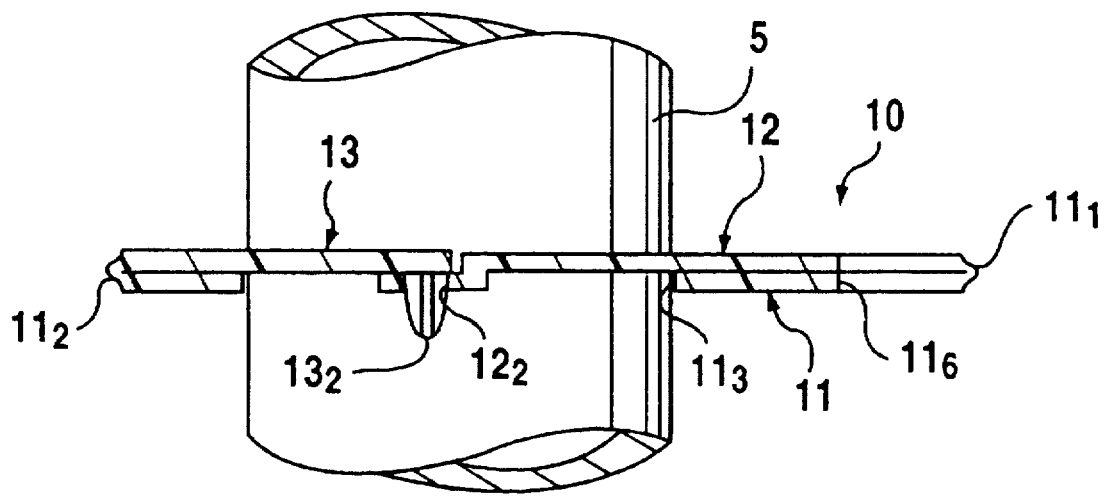
FIG. 5 is a sectional view taken along the line 5—5 in FIG. 2.
Figure 6:
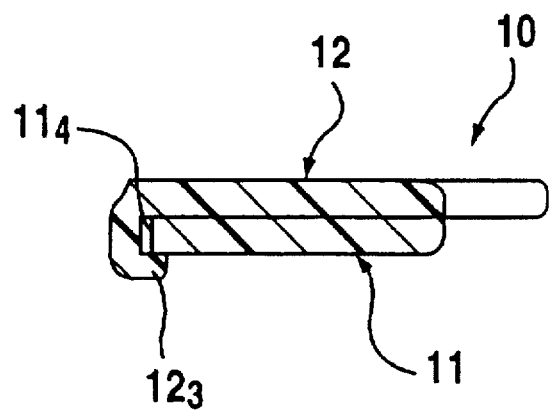
FIG. 6 is an enlarged sectional view taken along the line 6—6 in FIG. 2.
Figure 8:
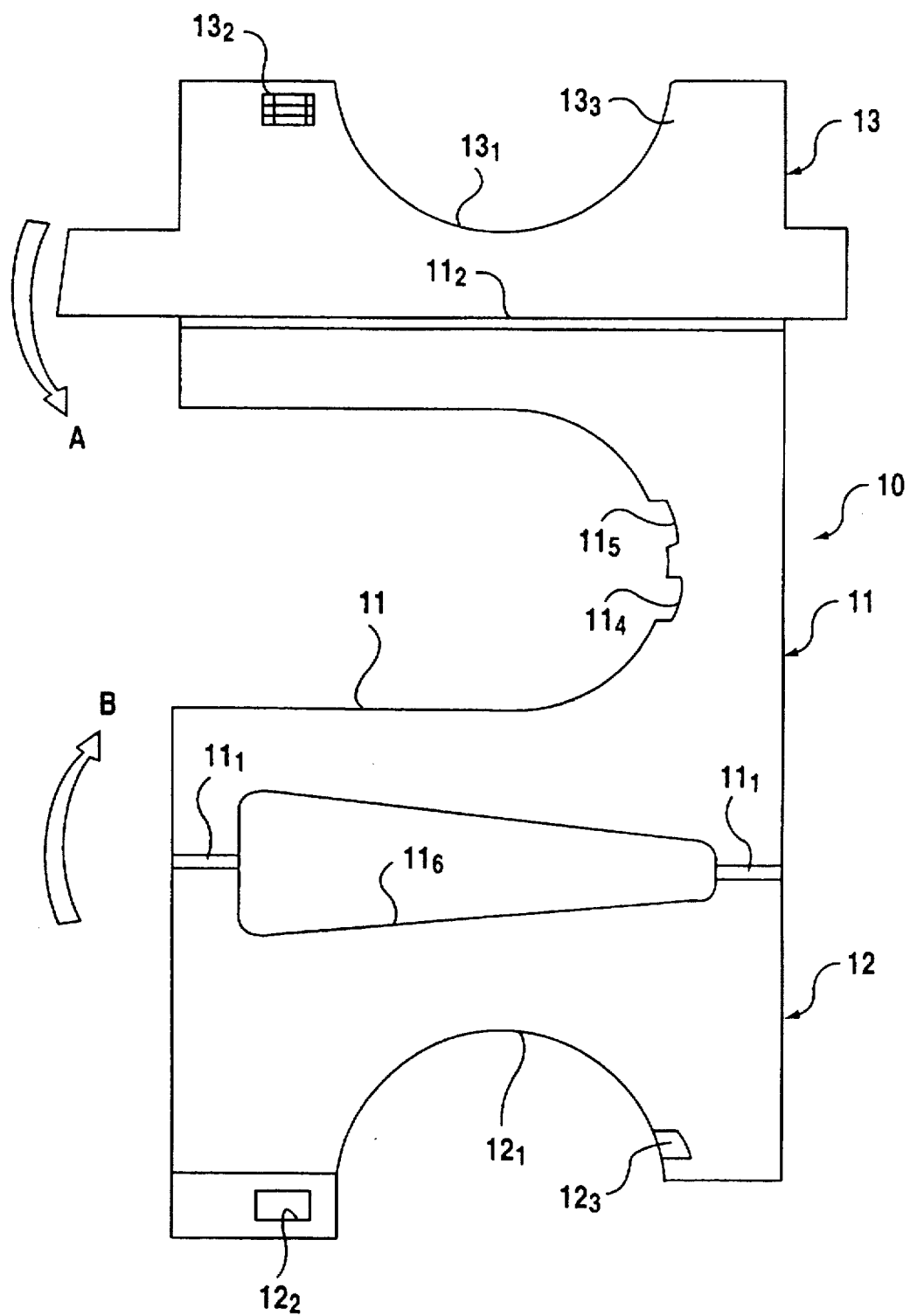
FIG. 8 is an illustration showing a roll bar strut cover in its developed state.

FIGS. 1 to 8 show an embodiment of the invention wherein FIG. 1 is a perspective view of an entire motor vehicle having a support member in the form of a roll bar stiffened by struts; FIG. 2 is an enlarged view taken along the arrow 2 in FIG. 1; FIG. 3 is a sectional view taken along the line 3—3 in FIG. 2; FIG. 4 is a sectional view taken along the line 4—4 in FIG. 2; FIG. 5 is a sectional view taken along the line 5—5 in FIG. 2; FIG. 6 is an enlarged sectional view taken along the line 6—6 in FIG. 2; FIG. 7 is a partial exploded perspective view of an essential portion of the support member and vehicle assembly; and FIG. 8 is an illustration showing a support member cover according to the invention in its developed state.

Although the description herein is particularly directed to a cover adapted to enclose, and thereby eliminate, the clearance between a roll bar strut and an associated vehicle panel, it should be appreciated that the desired invention is equally applicable to eliminating clearances between a roll bar body and such vehicle panel.

As shown in FIG. 1, a four wheel vehicle V is provided at the rear of its vehicle compartment with a load-carrying platform 2, and a roll bar 3 is mounted such as to connect left and right opposite sides of the load-carrying platform 2. The roll bar 3 includes a roll bar body 4 formed into an inverted U-shape, and two supporting struts 5 extending diagonally from the front part of the left and right legs $4_1$ for supporting the legs. These legs $4_1$ and the supporting struts 5 are strongly connected, within the vehicle, to a frame which is not shown.

The structure of the supporting struts 5 each passing through an upper surface of a side wall of the load-carrying platform 2 will be explained below with reference to FIGS. 2 to 8. Both the left and right supporting struts 5 have substantially the same structures and hence, only the left supporting strut 5 will be described.

The side wall of the load-carrying platform 2 is comprised of: an inner panel 6 located inside of the vehicle body and vertically extended; an outer panel 7 located outside of the vehicle body and vertically extended; and an upper panel 9 integrally formed at an upper end of the outer panel 7 to extend horizontally. An upper end of the inner panel 6 is bent outward in a horizontal direction to form a flange $6_1$, and the upper panel 9 is superposed on a lower surface of the flange 6, and coupled thereto by two bolts 8. The upper panel 9 is formed with an angled U-shaped notch $9_1$ having three substantially perpendicularly disposed sides opened at an inner side of the vehicle body, and the supporting strut 5 is loosely passed through a central position of the angled U-shaped notch $9_1$.

A front cover supporting portion $9_3$ is formed at a lower level at a front edge of the angled U-shaped notch $9_1$ in the upper panel 9 which is formed with a step $9_2$ interposed between the exterior surface of the panel and the portion $9_3$. A rear cover supporting portion $9_5$ is formed at a lower level at a rear edge of the notch $9_1$ with a step $9_4$ interposed between the exterior surface of the panel and the portion $9_5$. Further, a step $9_6$ lower than the front and rear cover supporting portions $9_3$ and $9_5$ is formed at that end edge of the notch $9_1$ which is located outside the vehicle body. Furthermore, a flange $9_7$ lower than the front and rear cover supporting portions $9_3$ and $9_5$ is formed at that end edge of the upper panel 9 which is located inside the vehicle body. The flange $6_1$ of the inner panel 6 is superposed on an upper surface of the flange $9_7$ and coupled thereto by the bolts 8.

As is shown in FIG. 8, a cover 10 for fitting about an outer periphery of the supporting strut 5 and superposed over the notch $9_1$ of the upper panel 9 is comprised of plate members which are integrally made of polypropylene. More specifically, the cover 10 is comprised of a central first plate member 11, a second plate number 12 connected to one side of the first plate member 11 through thin hinge portions $11_1$, and a third plate member 13 connected to the other side of the first plate member 11 through a thin hinge The first plate member 11 is formed with a U-shaped notch $11_3$ which opens forwardly and has two locking recesses $11_4$ and $11_5$ formed at a rear end thereof. A trapezoidally shaped weight-reducing hole $11_6$ is formed such as to extend astride the hinge portion $1_1$, connecting the first and second plate members 11 and 12. The second plate member 12 is formed at its outer end edge with a semicircular notch $12_1$, a locking hole $12_2$ and a locking projection $12_3$. The third plate member 13 is formed at its outer end edge with a semicircular notch $13_1$ and two locking projections $13_2$ and $13_3$.

In FIG. 8, when the second plate member 12 of the cover 10 is folded in the direction of the arrow A around the hinge portions $11_1$, and then, the third plate member 13 is folded in the direction of the arrow B around the hinge portion $11_2$, the locking projection $13_2$ is fitted into the locking hole $12_2$ of the second plate member 12 (see FIG. 5), the locking projections $12_3$ and $13_3$ of the second and third plate members 12 and 13 are respectively engaged with the locking recesses $11_4$ and $11_5$ of the first plate member 11, and the cover 10 is held in its folded state. At that time, the semicircular notches $12_1$ and $13_1$ of the second and third plate members 12 and 13 are superposed on the U-shaped notch $11_3$ of the first plate member 11 to form a substantially circular opening 14 which is fitted about the outer periphery of the supporting strut 5 without any clearance (see FIG. 2).

A trim member 15 for covering the upper surface of the cover 10 is provided with a three-sided notch $15_1$ which opens toward the inner side of the vehicle body, three clip bases $15_2$ each having a clip 16, and two locking projections $15_3$. In FIGS. 4 and 7 only one of the respective clip bases $15_2$ is shown. The upper panel 9, as shown in FIG. 2, is formed at its upper surface with three guide holes $9_8$ into which the three clip bases $15_2$ are respectively fitted from above. Each of the clips 16 provided on the respective clip bases $15_2$ is locked into a locking hole $9_9$ formed in a bottom of the guide hole $9_8$. Two locking holes $9_{10}$ to be engaged with the two locking projections $15_3$ of the trim member 15 are formed in a step $9_{11}$ which forms a boundary between the upper panel 9 and the outer panel 7.

Both the flanges $9_7$ and $6_1$ of the upper and inner panels 9 and 6, which are superposed on each other, are covered with a band-like side cover 17 (FIG. 2).

The cover 10, the trim member 15 and the side cover 17 are assembled according to a process described below. In a state in which the cover 10, the trim member 15 and the side cover 17 have not yet been mounted, the supporting strut 5 of the roll bar 3 is outwardly extended from the notch $9_1$ in the upper panel 9. There may be a slight error in the mounting position of the supporting strut 5, but such error is accommodated by a clearance between the sides of the notch $9_1$ and the supporting strut 5.

First, in a state in which the cover 10 remains developed, as shown in FIG. 8, the notch $11_3$ of the first plate member 11 is fitted about the outer periphery of the supporting strut 5 extending outwardly from the notch $9_1$ of the upper panel 9. Thereafter, the second plate member 12 of the cover 9 is bent through 180° in the direction of the arrow A around the hinge portions $11_1$, the locking projection $12_3$ of the second plate member 12 is engaged with the locking hole $11_4$ of the first plate member 11, the third plate member 13 is bent through 180° in the direction of the arrow B around the hinge portion $11_2$, and the two locking projections $13_2$ and $13_3$ of the third plate member 13 are engaged with the locking holes $12_2$ and $11_5$ of the second and first plate members 12 and 11, respectively.

With the above process, the cover 10 assumes a double structure in which the second and third plate members 12 and 13 are superposed on the first plate member 11, and an opening 14 formed by the semicircular notches $12_1$ and $13_1$ of the second and third plate members 12 and 13 is closely contacted with the entire periphery of the supporting strut 5 without any clearance (see FIG. 2). At that time, front and rear portions of a lower surface of the cover 10 are supported by upper surfaces of the front and rear cover-supporting portions $9_3$ and $9_5$ of the upper panel 9 and are capable of freely moving in longitudinal and lateral directions. Therefore, even if there is an error in the position of the supporting strut 5, the cover 10 can move such as to follow the supporting strut 5.

Subsequently, in a state in which the notch $15_1$ of the trim member 15 is fitted about the outer periphery of the supporting strut 5, each of the three clip bases $15_2$ having the clip 16 is inserted into each of the three guide holes $9_8$ in the upper panel 9 to bring each of the clips 16 into engagement with each of the locking holes $9_9$ and to bring each of the two locking projections $15_3$ into engagement with each of the two locking holes $9_{10}$ formed in the step $9_{11}$. At that time, a deviation in position of the supporting strut 5 can be accommodated by the clearance existing between the supporting strut 5 and the sides of the notch $15_1$ in the trim member 15. Finally, the side cover 17 is mounted to cover the open end of the notch $9_1$ in the upper panel 9 and the two bolts 8 which are exposed between the inner panel 6 and the side cover 17, thereby completing the operation.

In this state, the folded cover 10 is sandwiched between the upper panel 9 and the trim member 15, and only a portion of the periphery of the supporting strut 5 is not enclosed by the notch $15_1$ of the trim member 15. And even if there is a slight error in the mounting position of the supporting strut 5, the cover 10, whose opening 14 is closely contacted with the outer periphery of the supporting strut 5, can move such as to follow the supporting strut 5. Therefore, the opening 14 formed by the folded elements of the cover 10 is always closely contacted with a surface portion of the supporting strut 5 which is not enclosed by the notch $15_1$ of the trim member 15.

Thereby no clearance between the support strut 5 and the cover 10 can be generated. Thus, it is possible to prevent a clearance from being generated about a surface portion of the supporting strut 5, and to enhance an outward appearance of this part of the vehicle. It should be noted that if the trim member 15 and the cover 10 are made of the same material having the same color, the outward appearance can be further enhanced.

Because the cover 10 is designed as a folding structure, it is possible to tightly contact the opening 14 of the cover 10 with the outer periphery of the supporting strut 5, which has already been mounted to a vehicle frame, thereby also enhancing the assembly properties.

Although the embodiment of the present invention has been described in detail, it will be understood that the invention is not limited to the above-described embodiment, and various modifications in design may be made without departing from the spirit and scope of the invention defined in claims. For example, as explained above, the present invention has been applied to the supporting strut 5 of the roll bar 3 in the above-described embodiment, but the present invention is, of course, equally applicable to the roll bar body 4.

What is claimed is:

1. A cover structure for enclosing a tubular support member penetrating a vehicle panel, comprising:

an opening in said vehicle panel providing a clearance about said tubular support member for loose reception thereof;

a cover having an opening therein to receive said support member without clearance;

means on said vehicle panel forming a cover support permitting limited sliding movement of said cover with respect to said vehicle panel;

a trim member superposed upon said cover and containing an opening permitting passage of said tubular support member; and means for attaching said trim member to said vehicle panel.

2. A cover structure according to claim 1 in which said cover support comprises means defining a recess in said vehicle panel, said recess having a surface means for slidably supporting said cover and sides extending from said surface means for restricting the extent of movement of said cover.

3. A cover structure for enclosing a tubular support member according to claim 1, wherein said cover comprises:

a first plate member formed with a notch opened at an end edge of said first plate member over which said tubular support member can be fitted;

a second plate member formed on and foldable toward one side of said first plate member through a hinge portion; and a third plate member formed on and foldable toward the other side of said first plate member through another hinge portion, each of opposed end edges of said folded second and third plate members being formed with a notch closely contacted with the entire periphery of said tubular support member fitted in said notch of said first plate member.

* * * * *